US012000566B2

(12) United States Patent
Melzner et al.

(10) Patent No.: US 12,000,566 B2
(45) Date of Patent: Jun. 4, 2024

(54) SPOTLIGHT

(71) Applicant: Arnold & Richter Cine Technik GmbH & Co. Betriebs KG, Munich (DE)

(72) Inventors: Erwin Melzner, Frasdorf (DE); Volker Schumacher, Weingarten (DE); Ingrid Langrock, Weingarten (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 18/256,956

(22) PCT Filed: Dec. 14, 2021

(86) PCT No.: PCT/EP2021/085756

§ 371 (c)(1),
(2) Date: Jun. 12, 2023

(87) PCT Pub. No.: WO2022/129089

PCT Pub. Date: Jun. 23, 2022

(65) Prior Publication Data

US 2024/0068644 A1 Feb. 29, 2024

(30) Foreign Application Priority Data

Dec. 15, 2020 (DE) ..................... 10 2020 133 588.1

(51) Int. Cl.
*F21V 14/04* (2006.01)
*F21V 7/00* (2006.01)
(Continued)

(52) U.S. Cl.
CPC ............ *F21V 14/04* (2013.01); *F21V 7/0033* (2013.01); *F21V 14/02* (2013.01); *F21W 2131/406* (2013.01)

(58) Field of Classification Search
CPC .... F21V 7/0025; F21V 7/0033; F21V 7/0041; F21V 14/04; F21S 41/365; F21S 41/675; F21W 2131/406
See application file for complete search history.

(56) References Cited

U.S. PATENT DOCUMENTS

| | | | | |
|---|---|---|---|---|
| 2,307,977 A * | 1/1943 | Wellman | ................. | F21V 14/06 362/302 |
| 2,798,943 A * | 7/1957 | Prideaux | ................ | G03B 15/02 359/359 |

(Continued)

FOREIGN PATENT DOCUMENTS

| | | | |
|---|---|---|---|
| DE | 250574 C | 10/1910 | |
| DE | 19749181 A1 * | 5/1999 | .......... F21S 48/1388 |

(Continued)

OTHER PUBLICATIONS

International Search Report corresponding to PCT Application No. PCT/EP2021/085756, dated Apr. 21, 2022 (German and English language document) (5 pages).

(Continued)

*Primary Examiner* — Alexander K Garlen
(74) *Attorney, Agent, or Firm* — Maginot, Moore & Beck, LLP

(57) ABSTRACT

Spotlight (1) for illuminating a film, studio, stage, event and/or theatre environment, comprising: a light space (11) having an optical axis (17) which defines a light output direction; a light source (12) which is disposed in the light space (11); a housing (13) which delimits the light space (11) and extends in the light output direction; a main reflector (14) which delimits the light space, extends transversely with respect to the light output direction and, relative to the light output direction, is disposed upstream of the light source (12); an output optical unit (15) which is disposed at a light exit side of the light space (11) and, relative to the light output direction, is disposed downstream of the light source (12) and outputs the light of the spotlight (1); an auxiliary reflector (16), wherein the auxiliary reflector (16) is disposed movably, such that it can be positioned at least at a first position between the main reflector (14) and the light source (12) or at a second position between the light source (12) and the output optical unit (15).

20 Claims, 3 Drawing Sheets

(51) Int. Cl.

| | |
|---|---|
| ***F21V 14/02*** | (2006.01) |
| ***F21W 131/406*** | (2006.01) |

(56) References Cited

U.S. PATENT DOCUMENTS

| | | | | | |
|---|---|---|---|---|---|
| 4,823,243 | A * | 4/1989 | Weigert | F21V 19/02 | 362/373 |
| 6,004,007 | A * | 12/1999 | Weigert | F21V 19/02 | 362/306 |
| 6,499,862 | B1 * | 12/2002 | Weigert | F21S 10/00 | 362/268 |
| 2009/0073696 | A1 * | 3/2009 | Melzner | F21V 9/40 | 362/279 |

FOREIGN PATENT DOCUMENTS

| | | | | |
|---|---|---|---|---|
| EP | 0 071 558 | A1 | 2/1983 | |
| KR | 10-0979275 | B1 | 8/2010 | |
| WO | 94/15143 | A1 | 7/1994 | |
| WO | WO-2010093278 | A1 * | 8/2010 | B60Q 1/2611 |

OTHER PUBLICATIONS

Mole Richardson Co., “12,000 WATT 36” HMI Molebeam Daylight Projector, 2008, https://www.keylite.com/media/MRH8341.pdf.

* cited by examiner

SPOTLIGHT

TECHNICAL FIELD

The present invention relates to embodiments of a spotlight for illuminating a film, studio, stage, event and/or theatre environment. In particular, the present invention relates to an integration of two types of spotlight, on the one hand a wide-angle spotlight and on the other hand a narrow-angle spotlight, in an optical system.

BACKGROUND

Spotlights are typically used in order to illuminate a film, studio, stage, event and/or theatre environment. Sometimes, it is desirable for a spotlight to provide a wide adjustment range of a beam angle and at the same time to meet the further typical requirements, as are conventional for a film, studio, stage, event and/or theatre environment. However, the functions of a wide-angle spotlight and a narrow-angle spotlight (so-called projectors) are currently typically provided by different spotlights.

A projector can comprise e.g. an uprightly mounted lamp, e.g. a halogen-metal vapour lamp, e.g. of the type HMI 2500WSE or HMI 4000WSE, and a flat, smooth parabolic reflector having a large diameter and long focal length, said reflector is designed to collect the light of the lamp and to emit it in the form of a beam focused as narrowly as possible, and a number of annular stops, said stops being designed to screen the unused direct light and to allow only beams which are below a specific limit angle (e.g. <4°) to pass through an output optical unit. A data sheet of a spotlight MOLEBEAM 12 kW of the company Mole Richardson describes such a spotlight (https://www.keylite.com/media/MRH8341.pdf—retrieved on 14 Sep. 2020). However, such a projector is not designed to also implement the function of a wide-angle spotlight.

DESCRIPTION

Therefore, the object of the present invention is to provide a spotlight which advantageously combines the two functions, namely that of a wide-angle spotlight and that of a narrow-angle spotlight.

The invention is defined by the independent claims.

According to a first aspect, a spotlight for illuminating a film, studio, stage, event and/or theatre environment comprises: a light space having an optical axis which defines a light output direction; a light source which is disposed in the light space; a housing which delimits the light space and extends in the light output direction; a main reflector which delimits the light space, extends transversely with respect to the light output direction and, relative to the light output direction, is disposed upstream of the light source; an output optical unit which is disposed at a light exit side of the light space and, relative to the light output direction, is disposed downstream of the light source and outputs the light of the spotlight; an auxiliary reflector, the auxiliary reflector being disposed movably, such that it can be positioned at least at a first position between the main reflector and the light source or at a second position between the light source and the output optical unit. The output optical unit can be reconfigured between a first configuration corresponding to the first position of the auxiliary reflector and a second configuration corresponding to the second position of the auxiliary reflector.

According to a second aspect, a spotlight for illuminating a film, studio, stage, event and/or theatre environment comprises: a light space having an optical axis which defines a light output direction; a light source which is disposed in the light space; a housing which delimits the light space and extends in the light output direction; a main reflector which delimits the light space, extends transversely with respect to the light output direction and, relative to the light output direction, is disposed upstream of the light source; an output optical unit present in a first configuration, which is removably disposed at a light exit side of the light space and, relative to the light output direction, downstream of the light source and which, if mounted, outputs the light of the spotlight; an auxiliary reflector, the auxiliary reflector being disposed movably, such that it can be positioned at least at a first position between the main reflector and the light source or at a second position between the light source and the output optical unit.

Features of some exemplified embodiments are given in the dependent claims. The features of the dependent claims can be combined to form further embodiments, unless otherwise expressly stated.

On the basis of the two different positions of the auxiliary reflector and the respectively corresponding design of the output optical unit, embodiments of the spotlight render it possible, on the one hand, to emit a very narrowly focused light in the manner of a searchlight. Such lights are used for special effects and are also referred to in the film industry as "projectors" or "beam projectors". However, on the other hand, wide beam emission in the manner of a Fresnel spotlight is also possible without having to change the inner structure of the spotlight. Previously, it was necessary to provide a first spotlight to output a wide-angle beam and a further (second) spotlight to output a narrow-angle beam. The spotlight proposed in this case can be used to implement both directional characteristics. To this end, it is merely required to reposition the auxiliary reflector and reconfigure the output optical unit accordingly.

Further details and advantages of the invention will become apparent in the following description of some exemplified embodiments with reference to the figures.

BRIEF DESCRIPTION OF THE FIGURES

The parts shown in the figures are not necessarily to scale; rather, the emphasis is on illustrating principles of the invention. Furthermore, in the figures like reference signs designate mutually corresponding parts. In the Figures.

DETAILED DESCRIPTION

In the following detailed description, reference is made to the accompanying drawings which form part thereof and in which it is shown, through the illustration of specific embodiments, how the invention can be put into practice.

In this context, terminology indicating direction, such as e.g. "above", "below", "rear", "front", "behind", "downstream", "upstream", etc., can be used with reference to the orientation of the figures which are being described. Furthermore, terms such as "in front of", "after" or "behind" can designate the arrangement of components in relation to the direction of the light beams. "In front of the output optical unit" refers e.g. to an area facing away from the light exit side of the output optical unit. Since parts of embodiments can be positioned in a series of different orientations, the terminology indicating direction can be used for illustrative purposes and is in no way restrictive. It is noted that other embodiments can be applied and structural or logical changes can be carried out without departing from the scope of protection of the present invention. The following detailed description is therefore not to be understood in a restrictive sense and the scope of protection of the present invention is defined by the appended claims.

Reference is now made in detail to various embodiments and to one or several examples which are illustrated in the figures. Each example is presented in an explanatory manner and is not to be interpreted as a restriction of the invention. For example, features which are illustrated or described as part of one embodiment can be applied to or in conjunction with other embodiments to produce yet a further embodiment. It is intended that the present invention comprises such modifications and variations. The examples are described using specific language which should not be construed as restricting the scope of protection of the stated claims. The drawings are not to scale and are used for illustrative purposes only. For better understanding, the same elements have been identified by the same references in the different drawings, unless otherwise stated.

Figure 1:
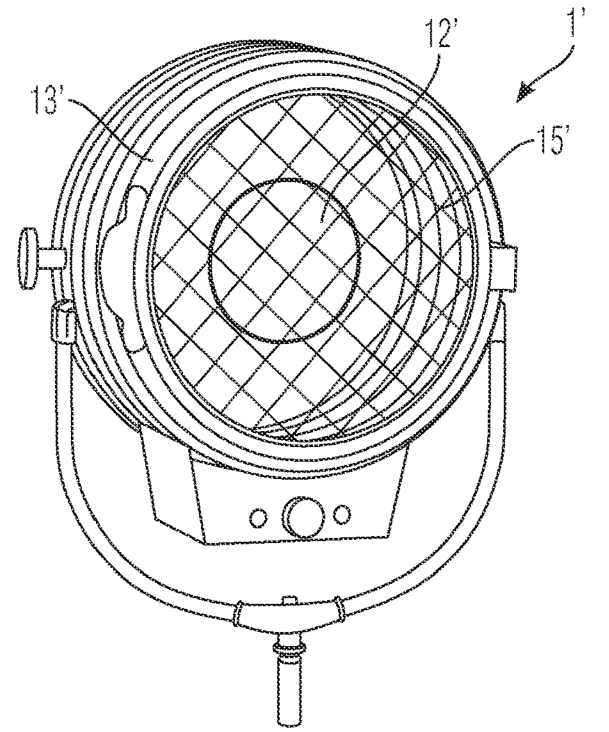
FIG. 1-2 show schematically and exemplarily an example of a spotlight for implementing a projector function.
Figure 2:
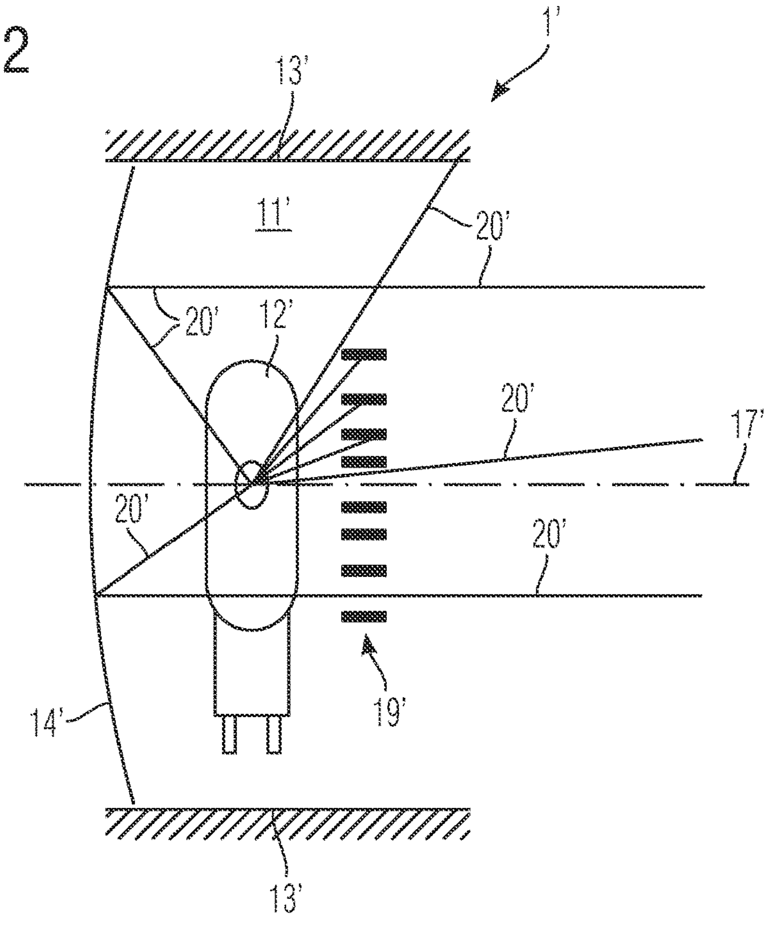

FIG. 1 shows a photo of a MOLEBEAM spotlight from the company Mole Richardson. FIG. 2 shows schematically the optical system on which FIG. 1 is based.

The spotlight illustrated in FIGS. 1 and 2 is a spotlight 1' for illuminating a film, studio, stage, event and/or theatre environment. The spotlight 1' comprises a light space 11' having an optical axis 17' which defines a light output direction; a light source 12' which is disposed in the light space 11'; a housing 13' which delimits the light space 11' and extends in the light output direction; a main reflector 14' (designed e.g. as a parabolic reflector) which delimits the light space 11', extends transversely with respect to the light output direction and, relative to the light output direction, is disposed upstream of the light source 12; an output optical unit 15' which is disposed at a light exit side of the light space 11' and, relative to the light output direction, is disposed downstream of the light source 12' and outputs the light of the spotlight 1'. In addition, annular stops 19' are provided which are designed to screen the unused, direct light and only allow beams which are below a specific limit angle (e.g. <4°, as illustrated by the schematically illustrated beam paths 20' in FIG. 2) to pass through the output optical unit 15'.

However, the spotlight (projector) illustrated in FIGS. 1 and 2 is not designed to also carry out the function of a wide-angle spotlight. A further disadvantage of this known projector is that the annular stops 19' which are necessary to produce a narrowly focused beam, obliterate the direct light from the light source 12' by scattering on their dark or rough surface, whereby the effectiveness is reduced and moreover the temperature in the light space 11' is increased.

Figure 3A:
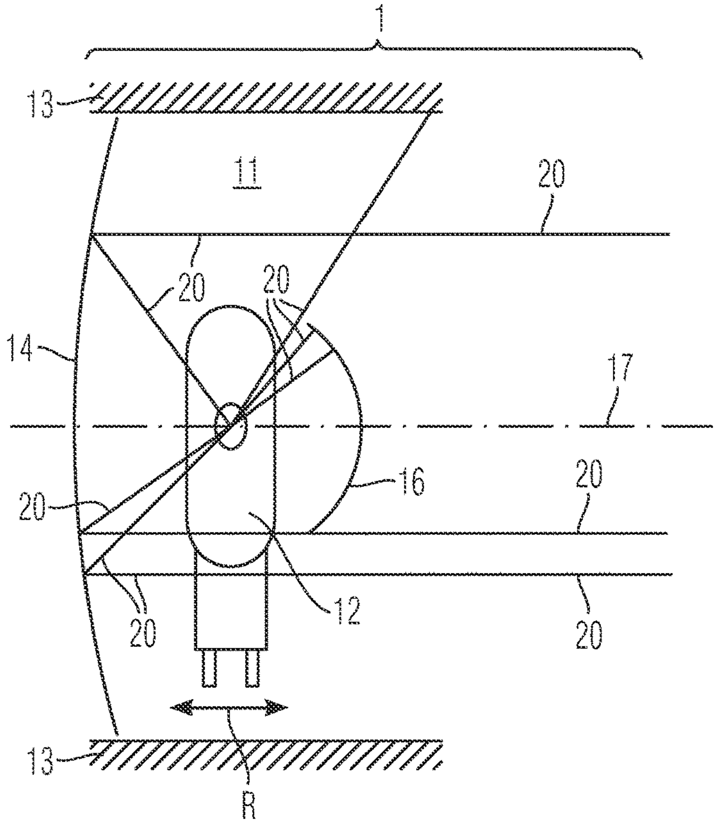
FIG. 3A-C show in each case schematically and exemplarily a portion of a cross-sectional view of a spotlight according to some embodiments.
Figure 3B:
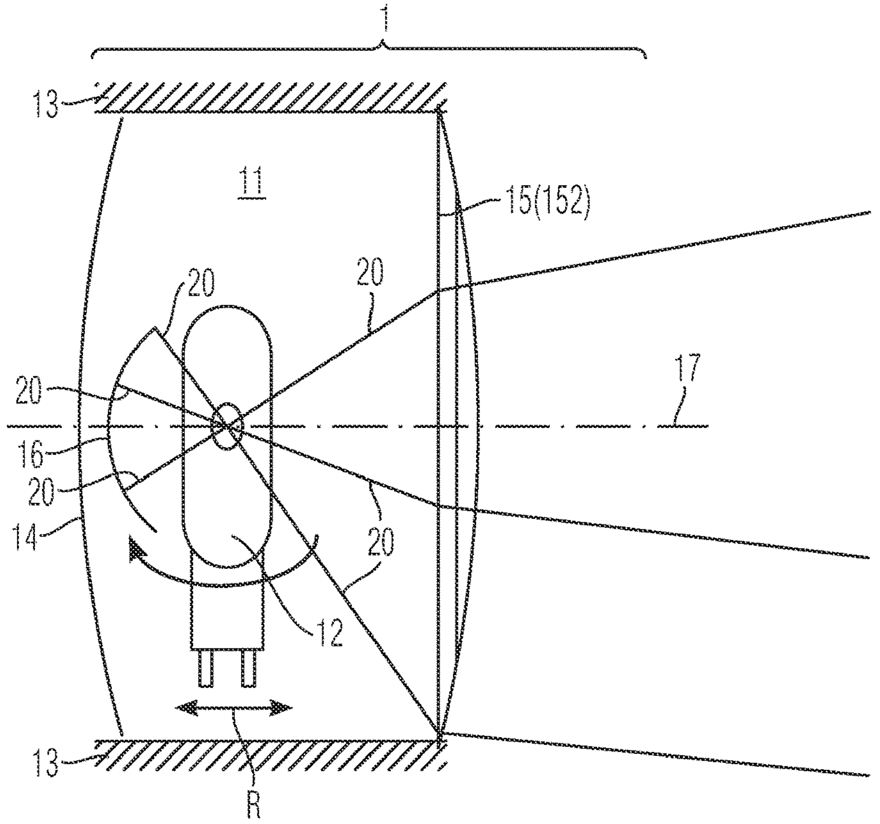
Figure 3C:
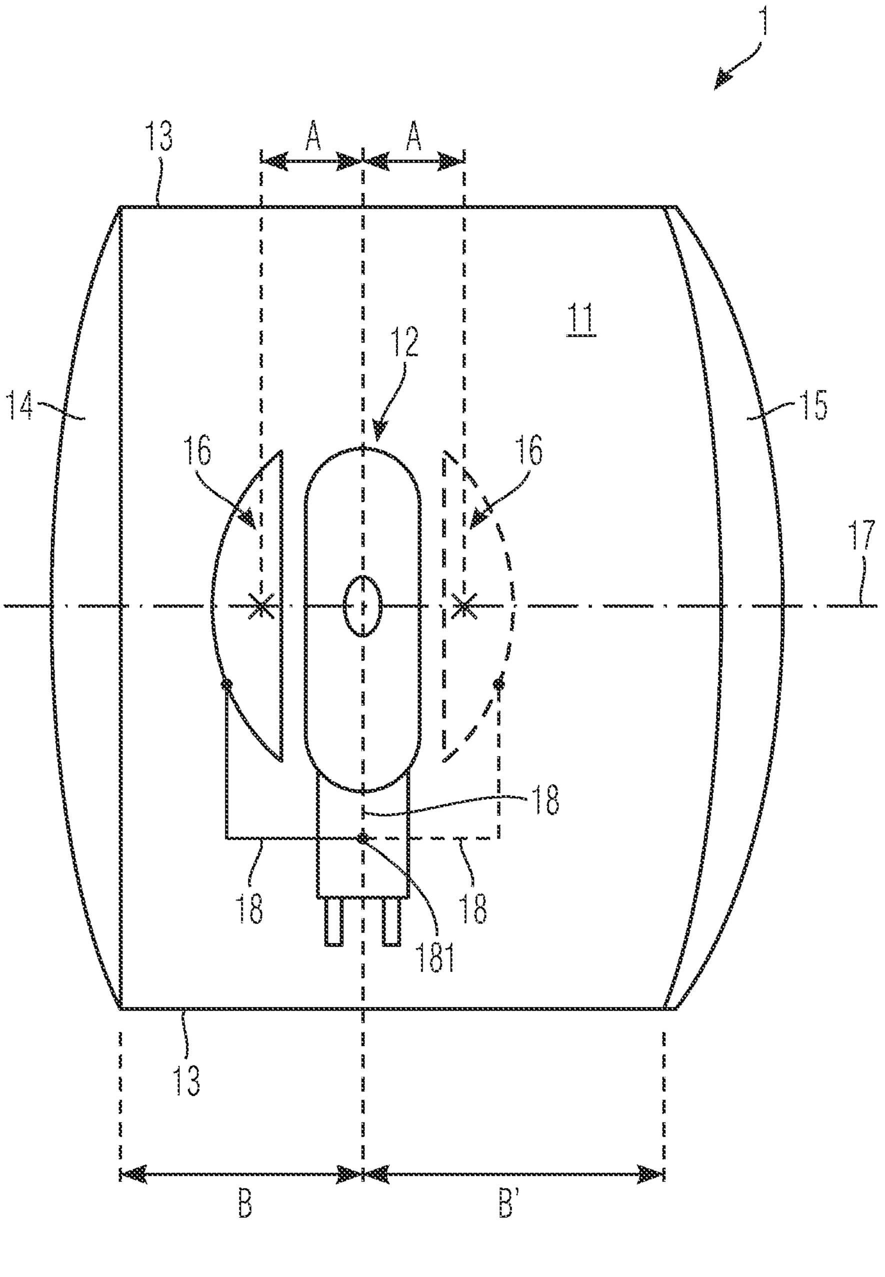

FIGS. 3A-C illustrate schematically and exemplarily a spotlight 1 for illuminating a film, studio, stage, event and/or theatre environment according to some embodiments.

In these embodiments the spotlight 1 comprises a light space 11 having an optical axis 17 which defines a light output direction; a light source 12 which is disposed in the light space 11; a housing 13 which delimits the light space 11 and extends in the light output direction; a main reflector 14 which delimits the light space 11, extends transversely with respect to the light output direction and, relative to the light output direction, is disposed upstream of the light source 12; an output optical unit 15 which is disposed at a light exit side of the light space 11 and, relative to the light output direction, is disposed downstream of the light source 12 and outputs the light of the spotlight 1.

An auxiliary reflector 16 is also provided, wherein the auxiliary reflector 16 is disposed movably, such that it can be positioned at least at a first position between the main reflector 14 and the light source 12 (see FIG. 3B) or at a second position between the light source 12 and the output optical unit 15 (see FIG. 3A). Furthermore, in some embodiments provision is made that the auxiliary reflector 16 has a different reflection property than the main reflector 14.

According to one embodiment, the auxiliary reflector 16 instead of a number of annular stops is thus provided in the light space 11.

The spotlight 1 with the auxiliary reflector 16 located in the first position functions as a wide-angle spotlight (which is schematically illustrated in FIG. 3B by the beam paths 20), corresponding to a so-called flood setting. If the auxiliary reflector 16 is located at the second position, the spotlight 1 functions as a narrow-angle spotlight/projector (which is schematically illustrated in FIG. 3A by the beam paths 20), corresponding to a so-called spot setting.

According to one embodiment, the output optical unit 15 can be reconfigured between a first configuration corresponding to the first position of the auxiliary reflector 16 (FIG. 3B) and a second configuration corresponding to the second position of the auxiliary reflector 16 (FIG. 3A). For example, the first configuration of the output optical unit 15 thus favours the output of a wide-angle beam and the second configuration of the output optical unit 15 favours the output of a narrow-angle beam. In another embodiment, the output optical unit 15 is present only in a specific (e.g. the first) configuration and is disposed removably; for this purpose, the output optical unit 15 does not have to be reconfigurable. For example, the output optical unit is present in the first configuration and is mounted in order to achieve the wide-angle function (FIG. 3B). In order to achieve the narrow-angle function (FIG. 3A), the output optical unit can then be removed so that the spotlight then outputs the light without the output optical unit. However, the light space can be limited by a grating and/or a protective separator or the like. The output optical unit 15 will be discussed in greater detail later on.

The light source 12 can comprise or can be designed as a halogen-metal vapour lamp (HMI light), a tungsten halogen lamp, an, or another, lamp radiating light forwards and backwards. According to one embodiment, the light source 12 is disposed so as to be movable in a direction along (see in this respect the embodiment relating to FIG. 3C) and/or transversely with respect to the optical axis 17. In this manner, the directional characteristic of the spotlight 1 can be further influenced. For example, in one embodiment the distance B' (see FIG. 3C) between the light source 12 and the output optical unit 15 can be variably adjusted along the optical axis 17. According to a further embodiment, the distance B (see FIG. 3C) between the light source 12 and the main reflector 14 can be variably adjusted along the optical axis 17. According to yet a further embodiment, the distance A (see FIG. 3C) 17 between the light source 12 and the auxiliary reflector 16 can be variably adjusted along the optical axis 17.

In one embodiment, the light source 12 outputs light in virtually all directions within the light space 11. As illustrated, the light source 12 can be disposed at a central position in relation to a trans-axial direction. In another embodiment, the light source 12 outputs light at least in the direction of the output optical unit 15 and in the direction of the main reflector 14, i.e. it radiates light "forwards" and "backwards". In the case of one light source in the form of an incandescent lamp, the latter variant can be broadly achieved by virtue of the fact that it has flat coils which lie in one plane (so-called monoplane lamps).

The auxiliary reflector 16 and the light source 12 are disposed e.g. on a common carrier 18 (see FIG. 3C) which is disposed so as to be movable in a direction of movement R in parallel with the optical axis, such that the distance between these two components and the main reflector 14 or the output optical unit 15 can be variably adjusted along the optical axis 17.

The housing 13 which delimits the light space 11 is e.g. not designed as a reflector (reflecting into the light space 11) in order to avoid scattered light which cannot be deflected into the main beam direction and thus adversely affects the light distribution. The housing 13 can have an approximately cylindrical shape, as illustrated by way of example. In one embodiment, the light space 11 is substantially solely delimited by the housing 13, the main reflector 14 and the output optical unit 15. The housing 13 couples e.g. the main reflector 14 to the output optical unit 15. For example, the housing 13 extends in the light output direction, e.g. in parallel with the optical axis 17. In another embodiment, the housing 14 has a conical section-like shape. Other geometric shapes of the housing 13 are possible depending upon the desired application of the spotlight 1.

The main reflector 14 terminates the light space 11 in the direction opposite to the light output direction. For example, the main reflector 14 closes off the e.g. cylindrical housing 13 like a lid. The main reflector 14 has e.g. a concave shape in relation to the light output direction. In addition, the main reflector 14 can be textured (any elevations or depressions, even irregular ones, e.g. for random scattering of the light) and/or facetted (reflector divided into precisely defined, planar or curved individual surfaces, wherein each facet deflects the light in a very specific way). The texturing/faceting can reduce or even eliminate colour errors and any brightness fluctuations. The texturing of the main reflector 14 is asymmetrical, e.g. in relation to the optical axis 17, so that the light field of the spotlight 1 is approximately circular.

According to the second embodiment, the output optical unit 15 (not shown in FIG. 3A) which is disposed on the other side of the light space 11 (e.g. removably) can only comprise a type of protective screen and/or grating which protects the light space 11 from external influences (e.g. closes it off in a manner sealed with respect to the environment), but otherwise does not perform any further optical function, but instead outputs the light generated in the light space in a substantially modified manner. The output optical device 15 comprises e.g. a UV-light protective screen.

In the first embodiment, the output optical unit 15 comprises e.g. a Fresnel lens 152, as illustrated schematically in FIG. 3B. By reason of the different positions of the auxiliary reflector 16, the entire beam angle range of the Fresnel lens 152 can be utilised, e.g. from "spot" (half-peak divergence of less than 10°) to "flood" (half-peak divergence of greater than 10°).

In one embodiment of the spotlight 1, the output optical unit 15 is disposed so as to be able to be removed or replaced. In order to achieve the wide-angle function, e.g. the Fresnel lens 152 is provided as the output optical unit 15 instead of the protective screen (FIG. 3B). In order to achieve the narrow-angle function, e.g. no Fresnel lens 152 is provided but instead only the output optical unit 15 designed as a protective screen, or even no output optical unit at all. The reconfiguration of the output optical unit 15 can thus be effected by either mounting the first embodiment (e.g. Fresnel lens) or mounting the second embodiment (e.g. a protective screen). In other words, the spotlight 1 can be provided having two output optical units 15. Depending upon the desired directional characteristic, either the first embodiment or the second embodiment of the output optical unit 15 is mounted.

In another variant, the spotlight comprises the output optical unit 15 in only one (e.g. the first) configuration; then the output optical unit 15, e.g. the Fresnel lens 152), is disposed removably. In this variant, the spotlight can also be operated without the output optical unit. In order to change the directional characteristic, the auxiliary reflector can change position and/or the output optical unit can be mounted in the specific configuration.

The output optical unit 15 can thus be present in the first embodiment and in the second embodiment, or can be present only in the first embodiment and be mounted or removed. Depending upon the desired function/directional characteristic of the spotlight 1, either the first embodiment of the output optical unit 15 is mounted or the second embodiment of the output optical unit 15 is mounted or the output optical unit is removed. For this purpose, the spotlight 1 may have a change-over socket, not illustrated in the drawings, which allows the two configurations of the output optical unit 15 to be easily changed or the output optical unit 15 to be easily mounted and removed. In this way, a user can quickly and conveniently significantly change the directional characteristic of the spotlight 1 by replacing or mounting/removing the output optical unit 15, and, if desired, additionally by changing the position of the auxiliary reflector 16.

In a further embodiment, only a single output optical unit 15 is present which can be configured such that it acts either like the first embodiment (e.g. to achieve a wide-angle beam) or like the second embodiment (e.g. to achieve a narrow angle beam).

The auxiliary reflector 16 has e.g. a different reflection property than the main reflector 14 and is disposed movably in the light space 11. The different reflection property is achieved e.g. in particular by reason of a stronger curvature and/or a smaller extension in the direction transverse with respect to the light output direction. The auxiliary reflector is designed e.g. as a smooth (non-textured) spherical reflector.

For example, provision is made that the auxiliary reflector 16 has, in the direction transverse with respect to the light output direction, an extension of at most 50% of a total extension of the main reflector 14 in this direction. The auxiliary reflector 16 can thus be considerably smaller than the main reflector 14. In one embodiment, e.g. it is also ensured that the auxiliary reflector 16 extends in the direction transverse with respect to the light output direction at least as far as 80% of a total extension of the light source 12 (e.g. the total extension of the bulb of an HMI light) in this direction.

The auxiliary reflector 16 which is designed e.g. as a spherical reflector is disposed e.g. in such a manner that a light spot of the light source 12 is located in a centre of curvature of the auxiliary reflector 16.

The auxiliary reflector 16 which is designed e.g. as a spherical reflector has e.g. a diameter which is dimensioned such that all beams from the auxiliary reflector 16 also impinge upon the main reflector 14 and from there also upon the output optical unit 15.

The distance A (see FIG. 3C) along the optical axis 17 between the light source 12 and the auxiliary reflector 16 is e.g. at least several cm in both positions. By reason of this distance A, it is ensured that the auxiliary reflector 16 receives and reflects a large part of the light emitted by the light source 12 in the respective direction and, moreover, that a permissible maximum temperature of the auxiliary reflector 16 is not exceeded.

Furthermore, in order to advantageously achieve the two functions (wide-angle/narrow-angle), provision is made that the auxiliary reflector 16 is concave at the first position (wide-angle) in relation to the light output direction, and that the auxiliary reflector 16 is convex at the second position (narrow-angle) in relation to the light output direction.

The degree of curvature of the auxiliary reflector 16 can be identical in both positions and can be e.g. several tens of millimetres, such as 135 mm. In contrast, the main reflector is rather weakly curved, and has e.g. a degree of curvature of several metres, such as 3 m.

At the first position (FIG. 3B), the auxiliary reflector 16 reflects at least a part of the light emitted by the light source 12 to the output optical unit 15, and at the second position (FIG. 3A), the auxiliary reflector 16 functions as a (e.g. spherical) counter-reflector which is designed to reflect at least a part of the light emitted by the light source 12 back to the main reflector 14.

The auxiliary reflector 16 can be variably adjusted in terms of its position relative to the light source 12.

For example, the auxiliary reflector 16 can be rotated and/or pivoted 180° about the light source 12 in order to position the auxiliary reflector 16 either at the first position and the second position. The rotating or pivoting can be effected azimuthally, above and/or below along the optical axis 17. The auxiliary reflector 16 is disposed at the first position entirely between the main reflector 14 and the light source 12, and is disposed at the second position entirely between the light source 12 and the output optical unit 15.

The position of the auxiliary reflector 16 can be adjusted e.g. during operation of the spotlight 1; the spotlight 1 can thus alternate between wide-angle setting (flood) and narrow-angle setting (spot) during operation.

In order to adjust the position of the auxiliary reflector 16, a mechanism can be provided which can be operated manually. In another embodiment, an electromechanical drive is provided which, upon receiving a corresponding control command (e.g. input via a corresponding user interface of the spotlight or spotlight remote control), selectively positions the auxiliary reflector at either the first or the second position.

FIG. 3C illustrates a further optional aspect of the spotlight 1. This figure shows the auxiliary reflector 16 at both the first position and the second position (dashed-line variant). In this embodiment, the auxiliary reflector 16 and the light source 12 are disposed on a common carrier 18. The carrier 18 and the light source 12 disposed thereon and the auxiliary reflector 16 disposed thereon form e.g. a unit or module of the spotlight 1. In one variant, the lamp 12 is disposed in a positionally fixed manner on the carrier 18. The carrier 18 is disposed movably e.g. in a direction in parallel with the optical axis 17 and can thus be variably adjustable in terms of its distance B (in relation to the light source 12) to the main reflector 14 or in terms of its distance B' to the output optical unit 15, which makes it possible to change the beam angle of the spotlight 1. The carrier 18 can comprise a pivot 181 (illustrated only schematically) which allows selective positioning of the auxiliary reflector 16 at the first position or at the second position. Furthermore, the auxiliary reflector 16 can be disposed movably on the carrier 18 so that a distance A along the optical axis 17 between the auxiliary reflector 16 and the light source 12 can be variably adjusted within an adjustment range of e.g. 100 mm.

The invention claimed is:

1. A spotlight for illuminating a film, studio, stage, event and/or theatre environment, comprising:

a light space having an optical axis which defines a light output direction;

a light source disposed movably in the light space;

a housing which delimits the light space and extends in the light output direction;

a main reflector which delimits the light space, extends transversely with respect to the light output direction and, relative to the light output direction, is disposed upstream of the light source;

an output optical unit which is disposed at a light exit side of the light space and, relative to the light output direction, is disposed downstream of the light source and outputs the light of the spotlight; and an auxiliary reflector, wherein the auxiliary reflector is disposed movably, such that it can be positioned at least at a first position between the main reflector and the light source or at a second position between the light source and the output optical unit, wherein the output optical unit can be reconfigured between a first configuration corresponding to the first position of the auxiliary reflector and a second configuration corresponding to the second position of the auxiliary reflector.

2. A spotlight for illuminating a film, studio, stage, event and/or theatre environment, comprising:

a light space having an optical axis which defines a light output direction;

a light source disposed movably in the light space;

a housing which delimits the light space and extends in the light output direction;

a main reflector which delimits the light space, extends transversely with respect to the light output direction and, relative to the light output direction, is disposed upstream of the light source;

an output optical unit which is present in a first configuration and is disposed at a light exit side of the light space and, relative to the light output direction, is disposed downstream of the light source so as to be able to be removed and which, if mounted, outputs the light of the spotlight; and an auxiliary reflector, wherein the auxiliary reflector is disposed movably, such that it can be positioned at least at a first position between the main reflector and the light source or at a second position between the light source and the output optical unit.

3. The spotlight as claimed in claim 1, wherein the spotlight having the auxiliary reflector located at the first position and the output optical unit present in the first configuration function as a wide-angle spotlight.

4. The spotlight as claimed in claim 1, wherein the spotlight having the auxiliary reflector located at the second position and the output optical unit present in the second configuration, or the removed output optical unit functions as a narrow-angle spotlight.

5. The spotlight as claimed in claim 1, wherein the main reflector is at least one of textured and faceted.

6. The spotlight as claimed in claim 1, wherein the output optical unit in the first configuration comprises a Fresnel lens (152).

7. The spotlight as claimed in claim 1, wherein a half-peak divergence of the emitted light is either in the range less than 10° or in the range greater than 10°.

8. The spotlight as claimed in claim 1, wherein the auxiliary reflector is disposed in such a manner that a light spot of the light source is located in a center of curvature of the auxiliary reflector.

9. The spotlight as claimed in claim 1, wherein the auxiliary reflector has a diameter which is dimensioned such that all beams from the auxiliary reflector impinge upon the main reflector.

10. The spotlight as claimed in claim 1, wherein the auxiliary reflector is at least one of concave at the first position and convex at the second position in relation to the light output direction.

11. The spotlight as claimed in claim 9, wherein the auxiliary reflector at the first position is more concavely curved than the main reflector in relation to the light output direction.

12. The spotlight as claimed in claim 1, wherein the auxiliary reflector at the first position reflects at least a part of the light emitted by the light source to the output optical unit.

13. The spotlight as claimed in any claim 1, wherein the auxiliary reflector at the second position is configured as a counter-reflector and is designed to reflect at least a part of the light emitted by the light source back to the main reflector.

14. The spotlight as claimed in claim 1, wherein the auxiliary reflector can be at least one of rotated and pivoted 180° about the light source.

15. The spotlight as claimed in claim 13, wherein the rotating or pivoting can be effected azimuthally at least one of above, below, and along the optical axis.

16. The spotlight as claimed in any claim 1, wherein the auxiliary reflector is disposed at the first position entirely between the main reflector and the light source or is disposed at the second position entirely between the light source and the output optical unit.

17. The spotlight as claimed in claim 1, wherein the light source is disposed so as to be able to move in a direction at least one of along and transverse with respect to the optical axis.

18. The spotlight as claimed in claim 1, wherein the light source and the auxiliary reflector are disposed on a common carrier, and optionally wherein at least one of:

the carrier comprises a pivot wherein the pivot allows selective positioning of the auxiliary reflector at the first position or at the second position; and/or the light source is disposed in a positionally fixed manner in relation to the carrier; and/or the carrier is disposed so as to be movable in a direction in parallel with the optical axis; and the auxiliary reflector is disposed movably on the carrier so that a distance along the optical axis between the auxiliary reflector and the light source can be variably adjusted within an adjustment range.

19. The spotlight as claimed in claim 1, wherein the light source includes a halogen-metal vapor lamp or a tungsten halogen lamp.

20. The spotlight as claimed in claim 1, wherein the housing couples the output optical unit to the main reflector.

* * * * *